(12) United States Patent
Zenner et al.

(10) Patent No.: US 10,749,229 B2
(45) Date of Patent: Aug. 18, 2020

(54) ARRANGEMENT FOR TEMPERING A BATTERY, VEHICLE, AND METHODS FOR HEATING AND COOLING A BATTERY

(71) Applicant: FORD GLOBAL TECHNOLOGIES, LLC, Dearborn, MI (US)

(72) Inventors: Thomas Zenner, Dueren (DE); Mazen Hammoud, Ann Arbor, MI (US); Daniel Benjamin Kok, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 16 days.

(21) Appl. No.: 16/121,887

(22) Filed: Sep. 5, 2018

(65) Prior Publication Data
US 2019/0097283 A1    Mar. 28, 2019

(30) Foreign Application Priority Data
Sep. 26, 2017   (DE) .......................... 10 2017 217 089

(51) Int. Cl.
*H01M 10/659*    (2014.01)
*H01M 10/63*     (2014.01)
(Continued)

(52) U.S. Cl.
CPC ....... *H01M 10/659* (2015.04); *H01M 10/625* (2015.04); *H01M 10/63* (2015.04);
(Continued)

(58) Field of Classification Search
None
See application file for complete search history.

(56) References Cited

U.S. PATENT DOCUMENTS 6,138,466 A * 10/2000 Lake ................. B60H 1/00278
                                                    62/199
6,575,156 B2   6/2003 MacFarlane et al.
(Continued)

FOREIGN PATENT DOCUMENTS

CN   205488415 U    8/2016
DE   102010046243 A1 * 3/2012 ........... F28D 20/028
(Continued)

OTHER PUBLICATIONS

Bullis Kevin. Novel Heating System Could Improve Electric Car's Range. Apr. 22, 2013. 1 page.
(Continued)

*Primary Examiner* — Ula C Ruddock
*Assistant Examiner* — Amanda Rosenbaum
(74) *Attorney, Agent, or Firm* — Brooks Kushman PC; David Kelley (57) ABSTRACT

A system and method for heating or cooling a battery include a controller and a tempering circuit containing an auxiliary medium configured to exchange heat with a container having a latent heat storage medium, and a vehicle traction battery, a pump configured to circulate the auxiliary medium, and an activation device having a sealing element moveable to selectively expose a nucleation surface to the latent heat storage medium to trigger a phase change process and exchange heat with the auxiliary medium.

8 Claims, 4 Drawing Sheets

(51) Int. Cl.
  *H01M 10/654* (2014.01)
  *H01M 10/625* (2014.01)
  *H01M 10/615* (2014.01)
  *H01M 10/613* (2014.01)
  *H01M 10/663* (2014.01)
  *H01M 10/637* (2014.01)

(52) U.S. Cl.
  CPC ........ *H01M 10/654* (2015.04); *H01M 10/613* (2015.04); *H01M 10/615* (2015.04)

(56) References Cited

U.S. PATENT DOCUMENTS

| | | | |
|---|---|---|---|
| 7,147,071 B2 | 12/2006 | Gering et al. | |
| 2005/0167169 A1* | 8/2005 | Gering | B60H 1/00278 237/12.3 B |
| 2012/0148886 A1* | 6/2012 | Krause | H01M 10/625 429/72 |
| 2012/0327596 A1* | 12/2012 | Anderson-Straley | H01M 10/625 361/689 |
| 2014/0004394 A1* | 1/2014 | Kerkamm | H01M 10/625 429/50 |
| 2015/0010789 A1* | 1/2015 | Yagi | H01M 10/659 429/50 |
| 2015/0311572 A1 | 10/2015 | Sing et al. | |

FOREIGN PATENT DOCUMENTS

| | | | |
|---|---|---|---|
| DE | 102014212404 A1 * | 12/2015 | ............... F01M 5/02 |
| DE | 102014212404 A1 | 12/2015 | |

OTHER PUBLICATIONS

Ashley Steven. Adsorption-based thermal batteries could help boost EV range by 40%. Aug. 30, 2013. 2 pages.
DE Examination Report DE 10 2017 217 089.1 Filed Aug. 14, 2018. 8 pages.

* cited by examiner

ARRANGEMENT FOR TEMPERING A BATTERY, VEHICLE, AND METHODS FOR HEATING AND COOLING A BATTERY

CROSS-REFERENCE TO RELATED APPLICATIONS

This application claims foreign priority benefits under 35 U.S.C. § 119(a)-(d) to DE Application 10 2017 217 089.1 filed Sep. 26, 2017, which is hereby incorporated by reference in its entirety.

TECHNICAL FIELD

The present disclosure concerns an arrangement for tempering a battery, a vehicle with such an arrangement, and methods for heating and cooling a battery.

BACKGROUND

In vehicles, accumulators are used as rechargeable storage units for electrical energy. As well as use as a starter battery, electric and hybrid electric vehicles have traction batteries which serve for electric drive of the vehicle.

These accumulators are generally temperature-sensitive and should be operated within a narrow temperature range. At low temperatures, e.g. temperatures below −25° C., the usable capacity of accumulators is restricted. At higher temperatures however, e.g. above 45° C., cooling of the battery may be necessary since the battery itself generates heat during its operation and the battery could be damaged at too high a temperature.

As the temperature falls, the internal resistance of the accumulator rises. Due to the increased resistance, the voltage drop under load increases, so that for the same load, the usable capacity is lower. There is also the risk of freezing of the electrolytes used in the accumulator.

This temperature-dependence restricts the usability of accumulators in motor vehicles at low exterior temperatures, and therefore constitutes a problem in particular for motor vehicles operated partially or exclusively electrically. Increasing the battery temperature by around 5° C. to 10° C. can significantly increase the usable capacity.

To solve this problem, electric heating for the battery for example is known. In addition, DE 10 2011 002 549 A1 proposes battery tempering by means of an aggregate state change material. A device is described for tempering a battery, comprising a battery and a latent heat store which can change its aggregate state from liquid to solid, and hence emit crystallization heat for heating the battery, wherein the crystallization may be triggered by a pulse. The latent heat store is contained in a housing arranged around the battery.

The inventors have found that in the arrangement described in DE 10 2011 002 549 A1, it is not possible for heat to be absorbed by the latent heat store independently of the battery, i.e. the latent heat store can only be transferred back to liquid state by the heat emitted by the battery. Also, the complete phase transition of the latent heat store from solid to liquid state is hindered in that circulation of the latent heat store is not possible in the solid state. Also, the arrangement described entails substantial structural changes in relation to the installation situation of the battery in the motor vehicle.

SUMMARY

The present disclosure is therefore based on indicating possibilities with which the above-mentioned disadvantages may be eliminated. In particular, a device and a method are indicated for tempering a battery of a motor vehicle, with which the battery may be heated independently of electrically powered heat sources. Also, easy integration in conventional battery heating and cooling systems is desirable.

The basic concept of the disclosure is to store thermal energy in a latent heat storage medium, emit the stored thermal energy to an auxiliary medium when required, e.g. at very low temperatures, and use the heated auxiliary medium for heating the battery. At high temperatures however, thermal energy can be transmitted from the battery to the auxiliary medium, and from this to the latent heat storage medium and stored therein. In other words, the heat transmission between the latent heat storage medium and the battery takes place indirectly by means of the auxiliary medium, which is always present in the liquid phase and therefore can be circulated e.g. by means of a pump.

This allows the arrangement of the latent heat storage medium in a separate container, separate from the battery. There is no need for transport or circulation of the latent heat storage medium.

Embodiments according to the disclosure allow tempering, in particular heating, of the battery independently of an external electrical power supply and hence for example also if the vehicle is not connected to a charging station.

Embodiments may advantageously be integrated in a conventional battery heating and cooling system so that at normal temperatures, the auxiliary medium and hence also the battery may be cooled or heated for example by means of an air-conditioning system or a PTC (positive temperature coefficient) heating element.

An arrangement according to the one or more embodiments for tempering a battery comprises a tempering circuit with a pump device, a battery arranged in the tempering circuit, a container which is arranged in the tempering circuit and contains a latent heat storage medium, and an auxiliary medium present in the tempering circuit for indirect heat transmission between the latent heat storage medium and the battery.

The tempering arrangement may be used to heat the battery, to cool the battery or both to heat and cool the battery, i.e. the term "tempering" means heating and/or cooling.

The term "battery" comprises both single or multiple primary cells and single or multiple secondary cells (accumulators). Examples of batteries in the sense of the present application are lithium-ion accumulators, e.g. lithium polymer accumulators, lithium cobalt-dioxide accumulators, lithium titanate accumulators, lithium air accumulators, lithium manganese-dioxide accumulators, lithium iron-phosphate accumulators, and tin sulphur lithium-ion accumulators. The battery may for example be configured as a starter battery or a traction battery of a vehicle.

The latent heat storage medium is a phase change material (PCM), of which the latent melt heat, dissolution heat or absorption heat is greater than the heat which it can store because of its normal specific thermal capacity. As well as the specific thermal capacity therefore, the latent heat of phase transition e.g. from liquid to solid, is thus available for storage of thermal energy.

A latent heat storage medium may be used, so that the phase transition of which from liquid to solid and vice versa, i.e. setting and melting, may be utilized. The phase transition temperature of the solid-liquid phase transition may lie in a temperature range between 10° C. and 90° C. in some embodiments, between 30° C. and 80° C. in some embodiments, and between 40° C. and 60° C. in some embodiments.

Suitable latent heat storage media may e.g. be salt hydrates, mixtures of salt hydrates or paraffins. In one embodiment, sodium acetate trihydrate is used as a latent heat storage medium, which has a phase transition temperature of 58° C. for the solid-liquid phase transition, but may also be present in a metastable state as a sub-cooled melt at lower temperatures of down to −20° C., since the salt dissolves in its crystal water. If crystallization is triggered, the latent heat storage medium heats up again to the phase transition temperature of the solid-liquid phase transition and emits thermal energy.

The melt heat connected with the solid-liquid phase transition is approximately 270 kJ/kg and is therefore greater than with most other latent heat storage media with a solid-liquid phase transition temperature in the low-temperature region between 40° C. and 100° C. In other words, the storable energy per kg is particularly high for sodium acetate trihydrate, so that little latent heat storage medium is required to store a specific thermal energy, so that the container 5 may be selected correspondingly small. In this way for example, installation space may be saved in a vehicle provided with the arrangement according to the invention.

Further examples of latent heat storage media are sodium sulphate decahydrate (solid-liquid phase transition temperature 32.5° C.), dipotassium hydrogen phosphate hexahydrate (solid-liquid phase transition temperature 14° C.) and calcium nitrate tetrahydrate (solid-liquid phase transition temperature 43° C.).

The latent heat storage medium may be arranged in a closed container, wherein the container is not restricted to a specific form. The volume of the container may be greater than the volume of the latent heat storage medium, to allow for any thermal expansion of the latent heat storage medium. Thus, it can be ensured that the latent heat storage medium is not released e.g. because of leakage.

The container may consist of a material with a high thermal conductivity to allow a good heat transmission between the latent heat storage medium present in the container and the auxiliary medium.

An auxiliary medium is present in the temperature circuit and serves for indirect heat transmission between the latent heat storage medium and the battery. Firstly, for example at very low battery temperature, the auxiliary medium may absorb thermal energy from the latent heat storage medium, e.g. utilizing the thermal conductivity of the container. Then the heated auxiliary medium is set in flow by means of the pump device, so that it reaches the battery and can emit thermal energy to the battery. For this, the battery may be arranged in a thermally conductive housing.

Secondly, the auxiliary medium may also absorb thermal energy from the battery and transmit it to the latent heat storage medium.

The auxiliary medium may for example comprise or consist of water.

Because of the use of an auxiliary medium, there is no need to transport the latent heat storage medium between different cavities. The risk of undesired release of the latent heat storage medium can thus be reduced.

The tempering circuit may be formed by lines, e.g. pipes or hoses, in which the auxiliary medium is present and can be set in flow by means of the pump device. An arrangement of components in the tempering circuit, e.g. the battery or container, means that heat transmission is possible between the corresponding components and the auxiliary medium, e.g. because the lines are in direct contact with the components. To improve the heat transmission, the tempering circuit may comprise devices for improving the heat transmission, e.g. rib-like or meandering structures to enlarge the surface area.

According to various embodiment variants, the latent heat storage medium may be present in a metastable state below its phase transition temperature, i.e. below the solid-liquid phase transition temperature Therefore, a latent heat storage medium may be used which may be present in a metastable state as a sub-cooled melt or sub-cooled solution. The phase transition from liquid to solid with the emission of thermal energy can then be triggered by nucleation in the sub-cooled melt or solution, e.g. by means of a pulse or seeding with nuclei. Advantageously, the time of phase transition and hence the start of heat emission can be controlled in this way.

For example, the latent heat storage medium may cool to ambient temperature without crystallization occurring, since the latent heat storage temperature is in its metastable state at ambient temperature.

The metastable state may be present down to a lower temperature limit of 0° C., or in some embodiments to a lower temperature limit of −10° C., or to a lower temperature limit of −20° C., or even to a lower temperature limit of −30° C. Thus, a heat emission is possible until said lower temperature limits are reached.

According to further embodiment variants, the arrangement may comprise a heating and/or cooling device in the tempering circuit for tempering the auxiliary medium. The heating and/or cooling device may be configured for example as an air-conditioning system or PTC heating element. It may be electrically powered.

In this way, thermal energy may be supplied to the auxiliary medium as it is electrically heated. Such an electrical heating may be achieved for example by means of an external power source, e.g. if the traction battery of the hybrid electric vehicle is charged at a charging station so that electrical energy may be supplied externally.

The heated auxiliary medium may then transmit thermal energy to the latent heat storage medium so that this can undergo a phase transition associated with heat absorption. The latent heat storage medium can thus be "regenerated" in order later, as required, to be able to emit thermal energy to the auxiliary medium again for heating the battery.

According to various embodiment variants, the tempering circuit may comprise a bypass for bypassing the battery, and a closing device for activating and deactivating the bypass.

When the bypass is deactivated, the auxiliary medium can flow to the battery and thermal energy may be transmitted between the battery and the auxiliary medium. When the bypass is activated, the auxiliary medium can flow through the bypass, bypassing the battery, and no thermal energy can be transmitted between the battery and the auxiliary medium. The closing device thus serves to close and open the bypass, so that the auxiliary medium flows either through the bypass or through the portion of the tempering circuit in which the battery is arranged.

For example, the bypass may be activated during heating of the auxiliary medium, and hence of the latent heat storage medium, by means of the heating and/or cooling device. Simultaneous heating of the battery can thus be eliminated. This is particularly advantageous if high temperatures are reached, e.g. temperatures above 60° C. or 70° C. which could lead to damage to the battery. The bypass is however deactivated for tempering the battery.

According to further embodiment variants, the arrangement may comprise an activation device arranged in the container and configured to trigger a crystallization process of the latent heat storage medium.

The activation device may for example release or provide crystal nuclei, or trigger a pulse which leads to crystallization of the latent heat storage medium. By means of the activation device, advantageously the time of crystallization can be controlled so that the heat emission associated with the liquid-solid phase transition may take place at a particular time, e.g. when heating of the battery is required.

The activation device may for example comprise a nucleation surface and a sealing element. The nucleation surface is configured to trigger a crystallization process of the heat storage medium when the temperature and pressure conditions allow, i.e. for example if the latent heat storage medium is present as a sub-cooled melt or sub-cooled solution. For this, the nucleation surface may for example comprise crystal nuclei, e.g. in the form of seed crystals.

The sealing element is configured for intermittently sealing the nucleation surface against the latent heat storage medium. In other words, by means of the sealing element, contact between the nucleation surface and the latent heat storage medium may be controlled. If the nucleation surface is sealed against the latent heat storage medium, i.e. there is no contact, crystallization of the latent heat storage medium can be suppressed. When the seal is released, the crystallization process is triggered.

The sealing element may for example be part of an electromagnetically powered valve, e.g. may be configured as a directly controlled solenoid valve. The sealing element may be attached to a magnetic holding element, e.g. a rod, which is moved between a sealing position and a non-sealing position by means of an electromagnetic actuator, e.g. a coil.

According to further embodiment variants, the arrangement may comprise a control unit which is designed and configured for controlling the pump device and/or the closing device and/or the activation device and/or the heating and/or cooling device, e.g. as a function of battery temperature.

To determine the battery temperature, the arrangement may comprise a battery temperature sensor, the sensor signal from which is transmitted to the control unit and processed by the control unit. Alternatively, the battery temperature may be estimated, e.g. from ambient temperature or, if the battery is in a vehicle situated in the open, from the exterior temperature.

If the battery temperature falls below a lower limit value for example, the pump device and where applicable the closing device and/or the activation device may be controlled such that thermal energy from the latent heat store is transmitted to the auxiliary medium and from the auxiliary medium to the battery, and the battery is heated.

If the battery temperature however reaches or rises above the lower limit value or exceeds an upper limit value, the pump device, the heating and/or cooling device and where applicable the closing device and/or the activation device may be controlled such that the auxiliary medium is heated by means of the heating and/or cooling device and thermal energy transmitted from the auxiliary medium to the latent heat storage medium.

Optionally, the arrangement may comprise a status sensor for determining the phase state of the latent heat storage medium. The status sensor may be configured for example as a temperature sensor. By means of the status sensor, the phase state, e.g. solid or liquid, of the latent heat storage medium may be established. A corresponding sensor signal may also be transmitted to the control unit and evaluated, and used in controlling the pump device and/or the closing device and/or the activation device and/or the heating and/or cooling device.

For example, it may be provided that the measures for heating the battery are carried out only if the latent heat storage medium is in a liquid phase state, since otherwise no phase transition associated with heat emission from liquid to solid can take place.

If, however, the latent heat storage medium is heated, on reaching the liquid phase state or on exceeding a temperature limit value for the latent heat storage medium, heating of the auxiliary medium by means of the heating and/or cooling device may be ended, since further heating would not bring any decisive advantages and the further thermal energy cannot be stored permanently.

When sodium acetate trihydrate is used as a latent heat storage medium, a temperature of 60° C. may be established as the temperature limit value. Since the solid-liquid phase transition temperature of sodium acetate trihydrate is 58° C., at a temperature of 60° C. the complete presence in a liquid phase state can be assumed.

Furthermore, the arrangement may comprise a device for determining the operating state of the battery, i.e. a device which can establish whether a power demand is made on the battery or will shortly be made.

A corresponding signal from the device may also be transmitted to the control unit and evaluated, and used in controlling the pump device and/or closing device and/or activation device and/or heating and/or cooling device.

For example, it may be provided that the measures for heating the battery are carried out only if a power demand is made on the battery or will shortly be made. Thus heating is advantageously performed only if it is actually necessary to heat the battery.

If the battery is a vehicle battery, a device for determining the operating state of the battery may be a start command device, e.g. a starter button, for starting the vehicle. A power demand is in this case made on the battery if the vehicle is to be started.

For example, a power demand on the battery may be expected shortly if a door handle of the vehicle is activated. If the door is opened, there is a high probability of starting the vehicle and hence a power demand on the battery can be assumed.

A motor vehicle according to the disclosure comprises an arrangement with the features described above. The vehicle may be configured as an electric or hybrid electric vehicle, e.g. as a mild hybrid electric vehicle or full hybrid electric vehicle. The battery may for example be a traction battery of an electric or hybrid electric vehicle.

One or more embodiments according to the disclosure have proved advantageous in particular for electric vehicles since in these vehicles, no waste heat from an internal combustion engine can be used to heat the battery, and these vehicles rely on proper functioning of the battery since they have no alternative source of energy supply.

A method according to one or more embodiments for heating a battery of an arrangement described above comprises causing a phase transition of the latent heat storage medium associated with a heat emission, heating of the auxiliary medium by means of the emitted heat, generation of a flow of the heated auxiliary medium in the tempering circuit, and transmission of thermal energy from the heated auxiliary medium to the battery.

The features of the method may be performed in the order cited, but also in a different order or in parallel to each other. For example, the heating of the auxiliary medium, the generation of the flow and the transmission of thermal energy are usually predominantly simultaneous.

The method according to one or more embodiments is performed by means of one or more arrangements as explained above, e.g. in a vehicle according to the disclosure. To this extent, the statements above explaining the arrangements also serve to describe the method.

The phase transition may be caused for example by means of the activation device described above. A phase transition associated with heat emission is in particular a solid-liquid phase transition.

According to various embodiment variants, the method may furthermore comprise establishing a lower limit value for the battery temperature and determining the battery temperature, wherein the other method steps are performed only if the temperature falls below the lower limit value. The battery temperature may for example be determined directly or estimated.

This embodiment of the method ensures that the battery is heated only if required, i.e. at low temperatures.

According to further embodiment variants, the method may comprise causing a phase transition of the latent heat storage medium associated with heat absorption by means of the supply of thermal energy to the latent heat storage medium.

For this, for example the auxiliary medium may be heated and thermal energy transmitted from the auxiliary medium to the latent heat storage medium. This method step may be performed either before or after causing a phase transition of the latent heat storage medium associated with heat emission, depending on the phase state of the latent heat storage medium at the start of the method.

A method according to one or more embodiments for cooling a battery of an arrangement described above comprises transmission of thermal energy from the battery to the auxiliary medium, generation of a flow of the heated auxiliary medium in the tempering circuit, and transmission of thermal energy from the auxiliary medium to the latent heat storage medium.

The features of the method may be performed in the order cited but also in a different order or in parallel with each other.

The method according to one or more embodiments is performed by means of the arrangement according to the embodiment(s) explained above, i.e. in a vehicle according to the disclosure. To this extent, the statements above explaining the arrangement of various embodiments also serve to describe the method according to one or more embodiments.

According to various embodiment variants, the transmission of thermal energy from the auxiliary medium to the latent heat storage medium causes a phase transition of the latent heat storage medium associated with heat absorption, e.g. from a solid to a liquid phase state. Thus, as well as the specific thermal capacity, the energy connected with the phase transition can be stored in the latent heat storage medium. Therefore, more thermal energy may be provided for subsequent heating of the battery.

The phase transitions of the methods described are solid-liquid phase transitions. The two methods, i.e. the method for heating the battery and the method for cooling the battery, may for example be performed alternately so that the latent heat storage medium functions as a temporary energy store. For example, at low exterior temperatures, on starting a vehicle, heating of the battery arranged therein may be necessary. This may be achieved using the method for heating the battery. After a specific operating period, the battery itself generates waste heat which can now be used, alone or in combination with thermal energy provided by the heating and/or cooling device, for heating the latent heat store.

The claimed subject matter will now be described in more detail with reference to one or more embodiments which, merely for illustration, include at least one specific embodiment in which the claimed subject matter may be implemented. It is understood that other embodiments may be used, and structural or logic changes made, without deviating from the scope of protection as defined by the claims. The drawings show:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not necessarily limiting, but merely provide a representative basis for teaching one skilled in the art to variously employ the claimed subject matter.

Figure 1:
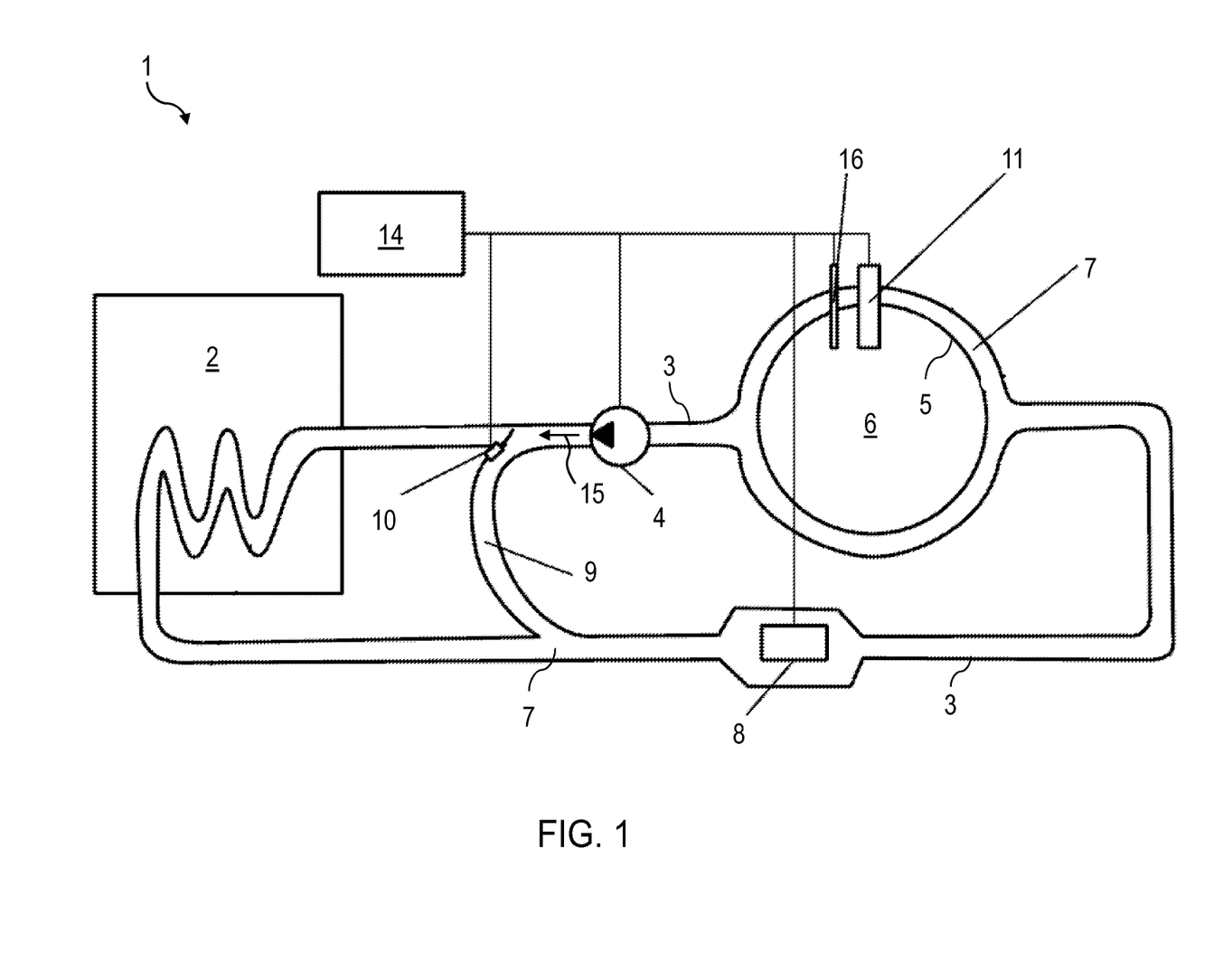
FIG. 1 is a diagrammatic depiction of an arrangement according to one embodiment.

FIG. 1 shows an arrangement 1 according to an embodiment. The arrangement 1 has a tempering circuit 3 containing the auxiliary medium 7, implemented by water in this embodiment, which can be set in a flow 15 by means of the pump device 4.

The arrangement 1 furthermore has a battery 2 arranged in the tempering circuit 3, which in this embodiment is a 400 V traction battery of an electric vehicle. However, this and other embodiments may be used for tempering all stationary or mobile batteries independently of their chemical composition.

In addition, the arrangement 1 has a container 5 containing a latent heat storage medium 6. In this embodiment, sodium acetate trihydrate is used as a latent heat storage medium 6, which has a solid-liquid phase transition temperature of 50° C. but can remain in a metastable liquid state down to a temperature of −20° C.

The container 5 with the latent heat storage medium 6 is also arranged in the tempering circuit 3 so that heat can be transmitted between the latent heat storage medium 6 and the auxiliary medium 7.

Similarly, heat can be transmitted between the auxiliary medium 7 and the battery 2. In other words, the auxiliary medium 7 is used for indirect heat transmission between the latent heat storage medium 6 and the battery 2. To improve the heat transmission between the auxiliary medium 7 and the battery 2, the tempering circuit 3 is formed as a meander in the region of the battery 2.

The tempering circuit 3 furthermore contains a heating and cooling device 8 with which the auxiliary medium can be heated or cooled as required.

In addition, the tempering circuit 3 has a bypass 9 for bypassing the battery 2. By means of the closing device 10, the bypass can be activated so that auxiliary medium 7 flows through the bypass 9 but not through the portion of the tempering circuit 3 containing the battery 2 (see flow 15 in FIG. 2). When the bypass 9 is deactivated, the auxiliary medium however flows through the battery portion of the tempering circuit 3 but not through the bypass 9 (see flow 15 in FIG. 3).

Figure 4A:
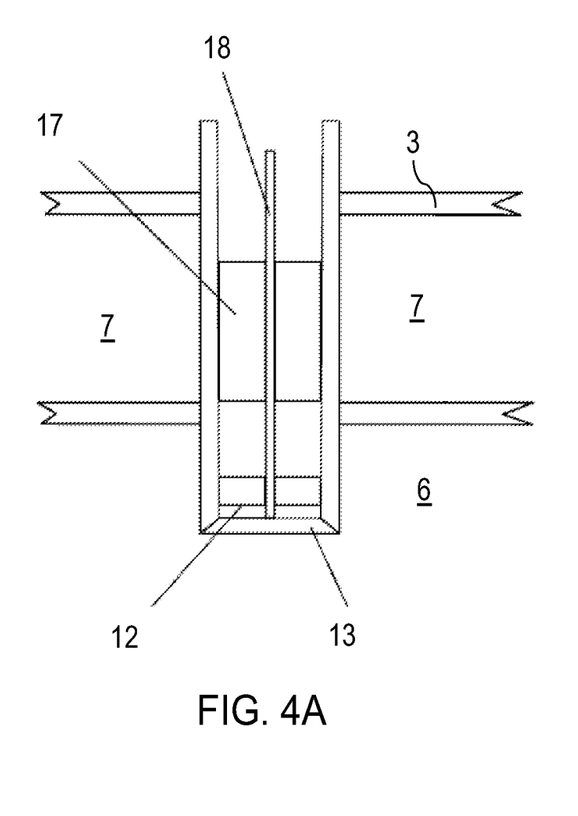
FIGS. 4A, 4B are diagrammatic depictions of an activation device in an embodiment in the activated and deactivated state.
Figure 4B:
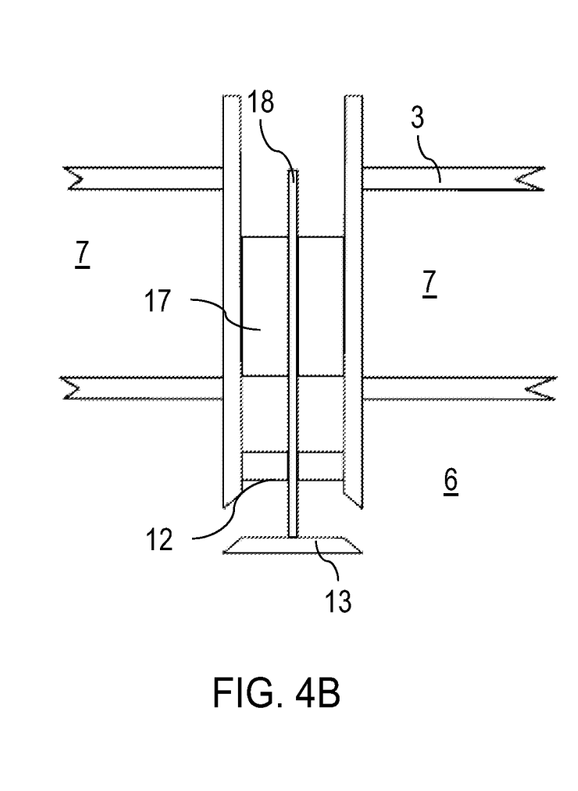

The container 5 contains an activation device 11 which is configured to trigger a crystallization process of the latent heat storage medium 6. The activation device 11, as shown in FIG. 4, has a nucleation surface 12 and a sealing element 13. In the embodiment shown in FIG. 4, the sealing element is attached to a magnetic rod 18 which can be moved between a deactivated state (FIG. 4A) and an activated state (FIG. 4B) by means of an electromagnetic actuator 17, implemented in this embodiment by a coil through which current flows.

In the deactivated state, the sealing element 13 seals the nucleation surface 12 against the latent heat storage medium 6, so that crystallization of the latent heat storage medium 6 can be prevented. If the latent heat storage medium 6, present in the metastable liquid state below the solid-liquid phase transition temperature, is however brought into contact with the nucleation surface 12, i.e. the activation device 11 is in the activated state in which the nucleation surface 12 is not sealed against the latent heat storage medium 6 by means of the sealing element 13, a crystallization of the latent heat storage medium 6 may be provoked. The crystallization propagates very rapidly through the entire latent heat storage medium 6. Since crystallization is an exothermic process, thermal energy is emitted to the auxiliary medium 7 via the container 5.

The container 5 furthermore contains a temperature sensor 16 for determining the temperature of the latent heat storage medium 6. A further temperature sensor (not shown) may be present optionally for determining the battery temperature.

The arrangement 1 furthermore comprises a control unit 14 which is designed and configured to control the pump device 4, the closing device 10, the activation device 11 and the heating and cooling device 8, for example depending on battery temperature, as described below with reference to FIGS. 2 and 3.

Figure 2:
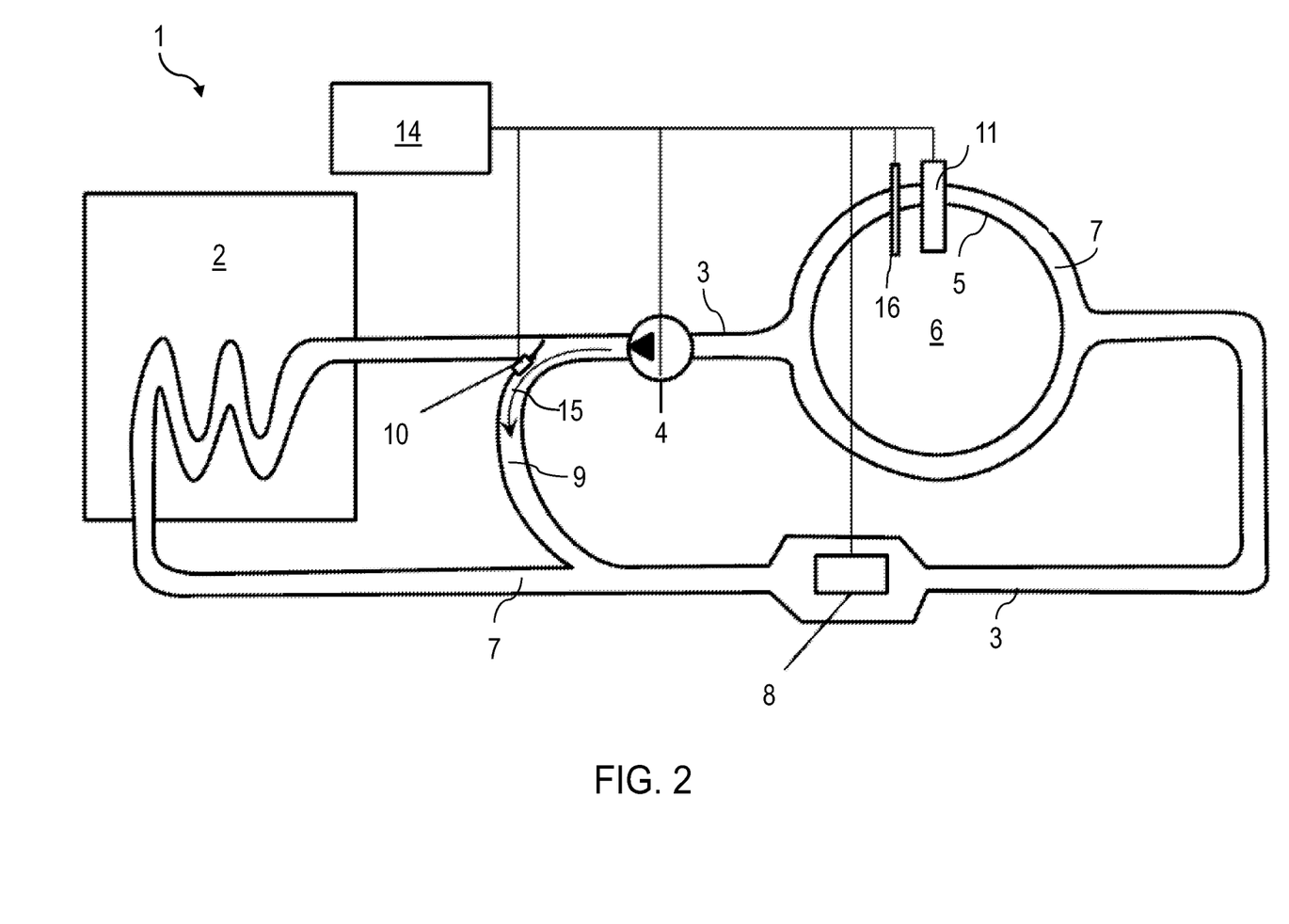
FIG. 2 is a diagrammatic depiction of an arrangement according to an embodiment during regeneration of the latent heat storage medium.

With reference to FIG. 2, initially the charging or regeneration of the latent heat storage medium 6 is described below, i.e. the transition from the solid to the liquid phase state.

The regeneration process may be initiated for example by a command from the vehicle driver, or automatically by a control system of the vehicle, e.g. if the latent heat storage medium 6 is present in a crystallized state and the exterior temperature lies below a specific value, e.g. below 0° C., so that a restricted function of the battery 2 is feared. A further precondition may be that the battery temperature exceeds a predefined limit value at the present time. These preconditions ensure that the regeneration process takes place only if there is a certain probability that a heating of the battery 2 will be necessary later, e.g. if, because of low exterior temperatures on parking the vehicle, the battery temperature is expected to fall to a temperature at which the performance of the battery 2 is restricted. At high exterior temperatures however, heating of the battery 2 is not required, so the energy necessary for regeneration can be saved.

To regenerate the latent heat storage medium 6, its temperature is increased to at least the temperature of the solid-liquid phase transition. This is achieved by heating the auxiliary medium 7 by means of the heating and cooling device 8. In the exemplary embodiment with sodium acetate trihydrate as a latent heat storage medium 6, the temperature of the auxiliary medium 7 may be increased for example to at least 70° C. The heating and cooling device 8 is controlled accordingly by the control unit 14.

Moreover, the pump device 4 is activated by means of the control unit 14 to generate a flow 15 of the auxiliary medium 7. Also, a corresponding control signal is output by the control unit 17 to configure the closing device 10 such that the bypass 9 is activated. This prevents the heated auxiliary medium 7 from heating the battery 2.

Due to the heat transmission from the auxiliary medium 7 to the latent heat storage medium 6, i.e. the supply of thermal energy, the latent heat storage medium 6 transfers from a solid phase state to a liquid phase state. When the temperature of the latent heat storage medium 6 reaches a specific limit value, in the case of sodium acetate trihydrate for example 60° C., the heating of the auxiliary medium 7 is terminated in that a corresponding control signal is emitted by the control unit 17 to the heating and cooling device 8. Here it is usually sufficient for the limit value to lie just above the solid-liquid phase transition temperature, since the temperature of the latent heat storage medium 6 does not change during the phase transition. If the temperature rises further, a complete phase transition is assumed, i.e. the latent heat storage medium 6 is now completely present in a liquid phase state.

After completion of the regeneration process, the latent heat storage medium 6 remains in the liquid state even at temperatures below the solid-liquid phase transition temperature, and is then metastable as long as no nucleation of the crystallization process takes place. For example, the latent heat storage medium may remain in liquid state even when the vehicle is parked overnight at low temperatures.

Figure 3:
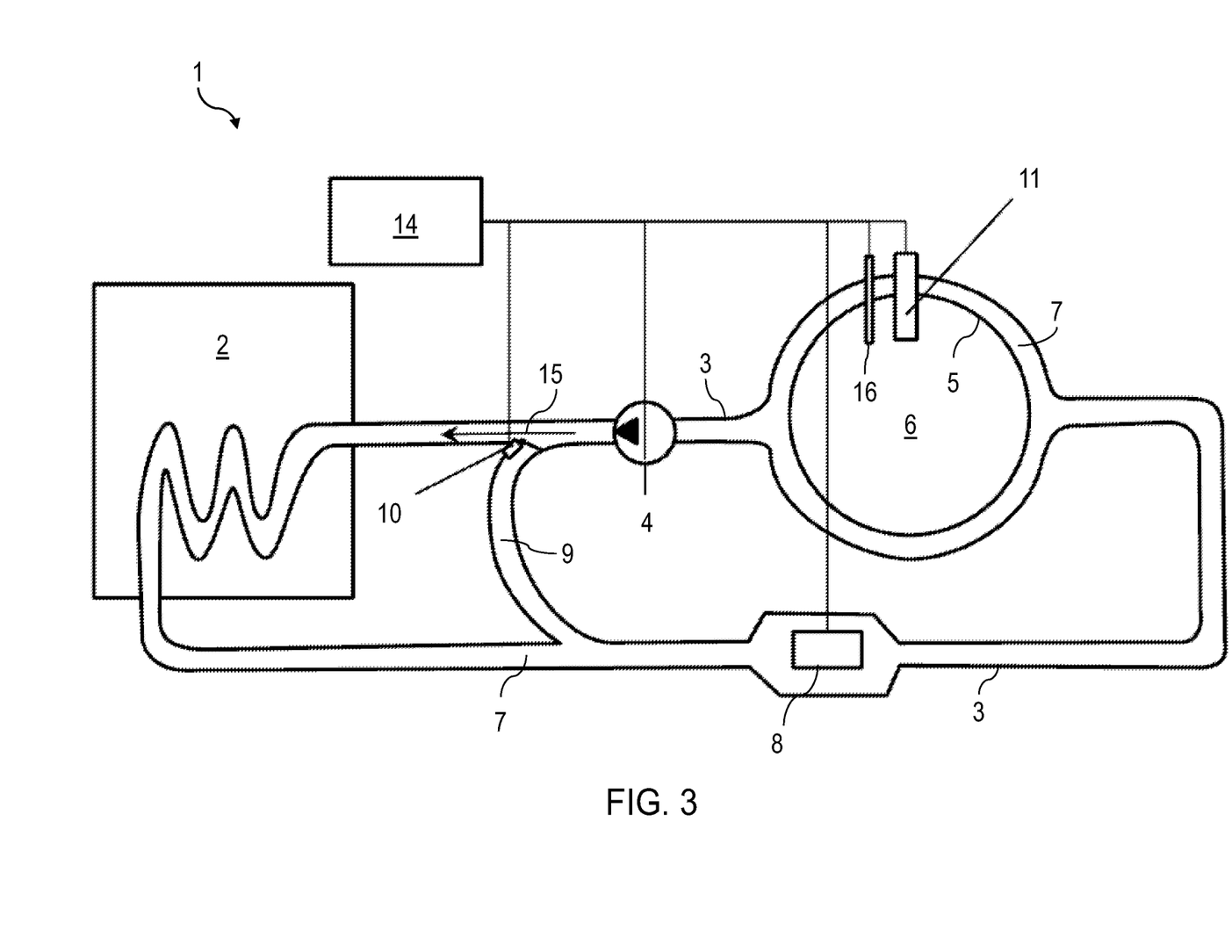
FIG. 3 is a diagrammatic depiction of an arrangement during heating of the battery.

Now with reference to FIG. 3, the performance of a representative method according to one embodiment for heating the battery 2 is described.

The heating of the battery 2 may be made dependent on various preconditions. For example, it may be provided that the battery 2 is heated only if the vehicle driver starts the vehicle by activating a starting button and the battery temperature lies below a lower limit value of e.g. −25° C. Also, the latent heat storage medium 6 must be in a liquid phase state.

If the preconditions are fulfilled, the control unit 14 operates the activation device 11 such that a crystallization of the latent heat storage medium 6 is triggered (FIG. 4B). For this, the sealing element is controlled such that it does not seal the nucleation surface 12 against the latent heat storage medium 6. The crystallization associated with heat emission is triggered by the contact of the latent heat storage medium 6, present in the metastable state, with the nucleation surface 12. In other words, a phase transition of the latent heat storage medium 6 associated with heat emission is caused.

The emitted thermal energy is transmitted to the auxiliary medium 7 and heats this. The pump device 4 is activated by means of the control unit 14 to generate a flow 15 of the auxiliary medium 7. Also, the control unit 17 emits a corresponding control signal which configures the closing device 10 such that the bypass 9 is deactivated. This prevents the heated auxiliary medium 7 from flowing only through the bypass 9.

Rather, the heated auxiliary medium 7 now flows through the portion of the tempering circuit 3 in which the battery 2 is arranged, so that thermal energy is transmitted from the heated auxiliary medium to the battery 2 and the battery 2 is heated.

The figures are not necessarily true to detail and scale, and may be depicted enlarged or reduced in order to offer a better overview. Therefore, functional details disclosed herein should not be regarded as restrictive but merely as an illustrative foundation, which offers the person skilled in this field of the art a basis for using the present invention in various ways. In the figures, identical or similar elements carry the same reference numerals where suitable.

The expression "and/or" used here in a series of two or more elements means that each of the elements listed may be used alone, or any combination of two or more of the listed elements may be used. If for example a composition is described which contains the components A, B and/or C, the composition may contain A alone, B alone, C alone, A and B in combination, A and C in combination, B and C in combination, or A, B and C in combination.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly described or illustrated.

What is claimed is:

1. A system comprising:
   a controller;
   a battery arranged to transfer heat to and from an auxiliary medium of a tempering circuit;
   a container in the tempering circuit containing a latent heat storage medium; and
   an activation device comprising:
   a nucleation surface;
   a poppet valve including a magnetic rod and being moveable between a deactivated state that seals the nucleation surface against the latent heat storage medium and an activated state that exposes the nucleation surface to the latent heat storage medium to trigger a crystallization process and heat the auxiliary medium; and
   an electromagnetic actuator configured to move the magnetic rod of the poppet valve between the deactivated state and the activated state;
   wherein the controller is configured to control the activation device to move the poppet valve and the magnetic rod to the activated state in response to temperature of the battery being below a lower limit value.

2. The system of claim 1 further comprising a pump configured to circulate the auxiliary medium through the tempering circuit.

3. The system of claim 1 wherein the latent heat storage medium may be present in a metastable state below an associated phase transition temperature.

4. The system of claim 1 further comprising a heating and/or cooling device arranged in the tempering circuit to heat and/or cool the auxiliary medium responsive to an associated request from the controller.

5. The system of claim 1 wherein the tempering circuit comprises a bypass configured to selectively bypass the battery, the system further comprising a valve connected to the controller for selectively activating and deactivating the bypass.

6. The system of claim 1 further comprising a temperature sensor configured to measure temperature of the latent storage medium in communication with the controller.

7. The system of claim 1 wherein the latent heat storage medium comprises sodium acetate trihydrate.

8. The system of claim 1 wherein the battery comprises a vehicle traction battery.

* * * * *